United States Patent [19]
Kosinsky

[11] 3,864,866
[45] Feb. 11, 1975

[54] PEST CONTROL DEVICE

[76] Inventor: Nathan Kosinsky, 70 Batteny Ave., Brooklyn, N.Y. 11228

[22] Filed: Nov. 9, 1973

[21] Appl. No.: 414,549

[52] U.S. Cl............................ 43/58, 43/114, 206/447
[51] Int. Cl........................................... A01m 23/00
[58] Field of Search.......... 43/58, 114; 206/447, 451

[56] References Cited
UNITED STATES PATENTS

| | | | |
|---|---|---|---|
| 417,400 | 12/1889 | Thum | 43/114 |
| 447,121 | 2/1891 | Stecher | 43/114 |
| 2,962,836 | 12/1960 | Hughes | 43/58 |

Primary Examiner—Louis G. Mancene
Assistant Examiner—Daniel J. Leach
Attorney, Agent, or Firm—Allison C. Collard

[57] ABSTRACT

A device for trapping rodents using two panels and a non-drying adhesive disposed on one surface of each panel. The panels are shipped in pairs, being pressed together with a common adhesive between them and are provided with brackets which seal their four edges during shipment. When the panels are to be used, a sharp edge is employed to cut the adhesive between the panels so that approximately an equal amount of adhesive will remain on one surface of each panel. The panels can then be opened and placed in areas frequented by pests and rodents.

2 Claims, 4 Drawing Figures

PATENTED FEB 11 1975 3,864,866

PEST CONTROL DEVICE

This invention relates to an improved trap for catching rodents and other small animals.

More specifically, this invention relates to an entrapment device for small animals, such as rodents, which utilizes a board and a tacky adhesive deposited on one surface of the board which has a sufficient strength to adhere to the feet of any small animals contacting the board.

In attempting to catch mice, rats and other pests, it has been known to use mechanical devices, such as mousetraps, or passive devices, such as poison, to exterminate the pests. The mousetraps have the obvious disadvantage of causing accidental injury to friendly pets and small children if they are placed in exposed areas. Likewise, the use of rat poison can also be dangerous to other pets and humans. In certain areas, such as hospitals, restaurants, hotels and institutions, the use of poison for extermination purposes is prohibited by local laws. It is therefore desirable to provide a means for trapping rodents and small pests which is non-toxic or mechanically dangerous to friendly animals and humans.

Accordingly, the present invention provides adhesively coated boards which are provided with a glue that is non-drying or hardening and remains active indefinitely so that rodents and small pests will stick to the boards. The rodents and pests caught by the boards usually die from dehydration after a short period of time and the boards can then be discarded.

The panels or boards of the present invention are manufactured by depositing an adhesive between the panels, spreading the adhesive, pressing the panels together so that the adhesive is contained between the panels. The panels formerly were demountably retained together by staples along their four edges. However, with this type of packaging, the user found difficulty in removing the staples from the panels due to their thickness, and the heavy-duty staples which were employed. Moreover, the staples did not provide a good seal along the four edges of the panels so that there was a tendency of the adhesive creeping out between the staples when the boards were tilted during shipment.

It is therefore an object according to the present invention to provide a device for trapping rodents and other pests which is non-toxic and mechanically harmless.

It is another object according to the present invention to provide a device for trapping rodents which is safe in its usage, inexpensive in cost, and efficient in operation.

Other objects and features of the present invention will become apparent from the following detailed description considered in connection with the accompanying drawing which discloses the embodiment of the invention. It is to be understood, however, that the drawing is designed for the purpose of illustration only and not as a definition of the limits of the invention.

In the drawing wherein similar reference characters denote similar elements in the several views.

Figure 1:
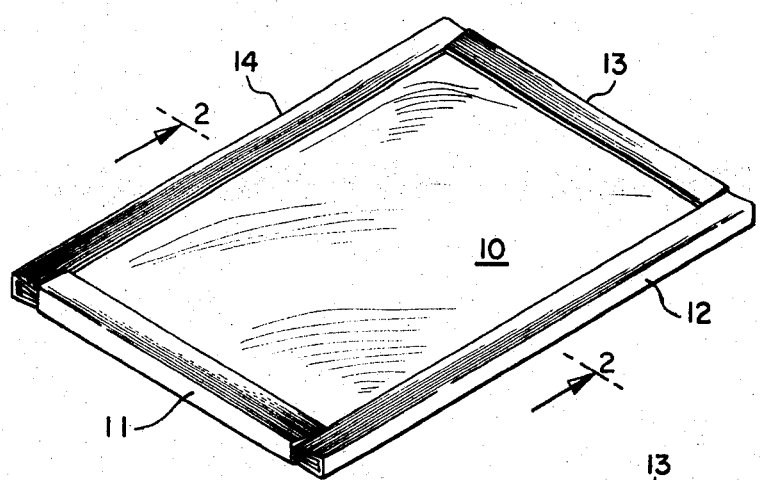
FIG. 1 is a perspective view of the improved device according to the invention.
Figure 2:
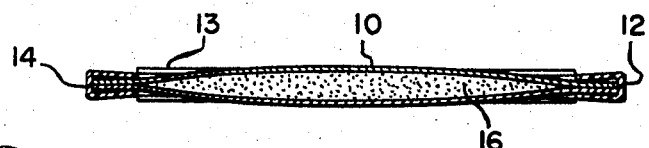
FIG. 2 is a cross-sectional view taken along section 2—2 of FIG. 1.

Referring to FIGS. 1 and 2, there is shown the rodent and pest trapping device having two panels 10 and 15 which form a sandwich with an adhesive 16 deposited between the panels. Panels 10 and 15 are preferably constructed identical in size and disposed one over the other so that their edges are in alignment. In order to demountably seal the edges of the panels and prevent the adhesive 16 contained between them from creeping when the board is tilted before usage, U-shaped brackets or strips 11, 12, 13 and 14 are slid over the edges in order to crimp the edges together. U-shaped brackets 11–14 are preferably constructed of a plastic material which has a spring-like force which urges the two panel edges together on all four sides of the device with the edges crimped together, the adhesive remains entrapped in the center portion of the boards until the boards are ready to be deployed.

Figure 3:
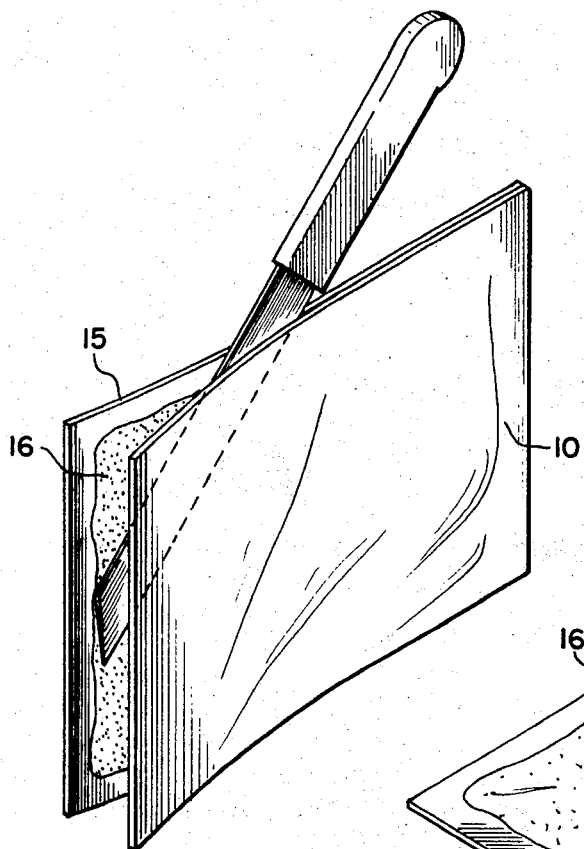
FIG. 3 is a further perspective view showing the splitting of the two boards.
Figure 4:
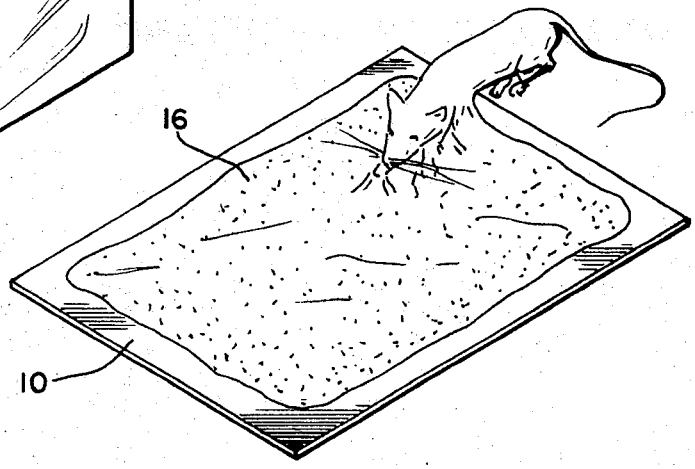
FIG. 4 is a perspective view showing an open and exposed board in operation.

When the boards are to be used, U-shaped brackets 11–14 are simply pulled away from the edges of the boards and are separated by cutting adhesive 16 approximately down its center portion so that an equal amount of adhesive will remain deposited on each surface of the separated panels. As shown in FIG. 3, a preferable method of separating the panels consists of slicing the adhesive with a knife over the entire length of the panels.

Each of the separated panels is then exposed with its adhesive 16 covering most of its surface area. The panels can then be placed in areas where rodents and pests are likely to frequent.

The adhesive is preferably a non-drying and non-hardening material manufactured from 60 percent linseed oil and 40 percent rosin by weight.

Panels 10 and 15 are preferably constructed of rigid paper material, such as 30 pound felt roofing paper, and cut in panels of approximately 8 inches by 11 inches.

U-shaped brackets are preferably constructed of rigid plastic material and their lengths are cut in accordance with the dimensions of the panels. They are preferably used in widths of three-eighths of an inch to one-half inch in order to compress the edges of the panels.

The device of the present invention is preferably manufactured by depositing the adhesive over the center portion of one of the two panels and spreading it toward the edges. The amount of adhesive used is measured so as to accommodate two panels. The second panel is then pressed in alignment over the first panel and onto the adhesive, causing the two panels to stick together. Brackets 11–14 are then pressed onto the four edges of the board so that the adhesive has a chance to spread and settle across the interior surfaces of the board up to the bracketed edge portions. The boards are preferably approximately 8 inches by 11 inches in size and approximately one-eighth of an inch thick. They are also preferably packaged together in an envelope before shipment, the envelope being slightly larger than the outside dimensions of the brackets so as to prevent the brackets from accidently becoming dislodged from the edges of the panels.

While only a few embodiments of the present invention have been shown and described, it is obvious that many changes and modifications may be made thereunto without departing from the spirit and scope of the invention.

What is claimed is:

1. A pest control device comprising:
   a first rigid rectangular panel;
   a non-drying adhesive disposed on one surface of said panel;
   a second rigid rectangular panel substantially the same size as said first panel and disposed over said first panel and in contact with the adhesive surface;
   a rigid U-shaped plastic strip having opposed lateral surfaces coupled to each of the common edges of said panels, the surfaces of said strips having a spring-like force to urge the common panel edges together in sealing relationship so as to prevent the adhesive from leaking from the panels.

2. The pest control device as recited in claim 1 wherein said non-drying adhesive comprises a mixture of 60% linseed oil and 40% rosin.

* * * * *